United States Patent [19]

Kameda et al.

[11] Patent Number: 4,920,828
[45] Date of Patent: May 1, 1990

[54] PLANETARY GEAR TYPE TRANSMISSION

[75] Inventors: Osamu Kameda; Satoshi Fujikawa; Toshiharu Shinmoto, all of Hiroshima, Japan

[73] Assignee: Mazda Motor Corporation, Hiroshima, Japan

[21] Appl. No.: 307,286

[22] Filed: Feb. 7, 1989

[30] Foreign Application Priority Data

Feb. 8, 1988 [JP] Japan .................................. 63-26814
Sep. 12, 1988 [JP] Japan ................................. 63-118903

[51] Int. Cl.$^5$ ...................... F16H 57/10; F16H 55/18
[52] U.S. Cl. ...................................... 475/299; 74/409;
475/159; 475/204; 475/320
[58] Field of Search .................... 74/409, 440, 785–788

[56] References Cited

U.S. PATENT DOCUMENTS

| 2,815,974 | 12/1957 | Stubbe | 74/785 X |
|---|---|---|---|
| 4,063,470 | 12/1977 | Kelbel | 74/785 |
| 4,074,591 | 2/1978 | Dick | 74/785 X |
| 4,103,753 | 8/1978 | Holdeman | 180/49 |
| 4,286,480 | 9/1981 | Dickie | 74/785 |
| 4,294,159 | 10/1981 | Wendler et al. | 74/409 |
| 4,549,449 | 10/1985 | Miller et al. | 74/785 |
| 4,604,908 | 8/1986 | Dolan | 74/785 |
| 4,630,496 | 12/1986 | Yasuoka | 74/440 X |
| 4,688,441 | 8/1987 | Yasukawa | 74/440 X |
| 4,696,201 | 9/1987 | Hattori et al. | 74/440 X |
| 4,739,670 | 4/1988 | Tomita et al. | 74/440 X |
| 4,771,654 | 9/1988 | Shinjo et al. | 74/409 X |
| 4,804,061 | 2/1989 | Kameda | 180/247 |

FOREIGN PATENT DOCUMENTS

| 62-7419 | 2/1962 | Japan . | |
| 61-36748 | 3/1986 | Japan . | |
| 2151316 | 7/1985 | United Kingdom | 74/785 |

Primary Examiner—Dwight G. Diehl
Attorney, Agent, or Firm—Wenderoth, Lind & Ponack

[57] ABSTRACT

A transmission is equipped with a planetary gear type transmission unit disposed between an input member and an output member within a casing. The transmission unit is comprised of a sun gear, a ring gear and a plurality of planet gears carried by a carrier coupled with the output member. The planet gears are in mesh with the sun gear and the ring gear. The input and output members are coupled with each other by bypassing the gears of the transmission unit in direct drive or via these gears in reduction ratio drive. The transmission is further provided with a first change-over member in mesh with the input member for selectively connecting the input member with the carrier in direct drive or with the sun gear in reduction ratio drive and a second change-over member secured to the first change-over member for engaging the ring gear with the casing in reduction ratio drive or disengaging the former from the latter in direct drive.

9 Claims, 8 Drawing Sheets

1

PLANETARY GEAR TYPE TRANSMISSION

BACKGROUND OF THE INVENTION

1. Field of the Invention

The present invention generally relates to a power transfer mechanism, and more particularly, to a planetary gear type transmission incorporated in the power transfer mechanism.

2. Description of the Prior Art

The Japanese Patent Publication No. 62-7419 discloses a planetary gear type transmission as shown in FIG. 10. This transmission is comprised of an input shaft 1, a sun gear 2 rigidly secured to the input shaft 1, an output shaft 3, a carrier 4 splined to the output shaft 3 for rotation therewith and slidable in the direction axially of the output shaft 3, a plurality of planet gears 6 carried by the carrier 4 and a ring gear 5 carried by the planet gears 6. The planet gears 6 are in mesh with the sun gear 2 and the ring gear 5. The sun gear 2, the carrier 4, the planet gears 6 and the ring gear 5 constitute a planetary gear unit U.

The planetary gear unit U is shiftable between high and low speed conditions for direct drive and reduction ratio drive modes. In the direct drive mode, the planetary gear unit U is shifted rightwards, as shown in FIG. 10, so that the ring gear 5 may become free for prevention of excessive rotation of the planet gears 6. On the contrary, in the reduction ratio drive mode, the planetary gear unit U is shifted leftwards, as shown in FIG. 11, to lock the ring gear 5 to its casing 7 so that the planet gears 6 may be brought into sun-and-planet motion.

However, the change-over between the high and low speed conditions is done by shifting the entire planetary gear unit U, thus needing relatively large operation force and rendering the planetary gear unit to become complicated in construction.

The Japanese Utility Model Laid-Open Application No. 61-36748 discloses another planetary gear type transmission equipped with a planetary gear unit employing helical gears for its constituent rotary elements. Also, in this transmission, the engagement of the ring gear with respect to the casing is released in the high speed condition for the direct drive mode.

However, when the ring gear is made free in the direct drive mode, the sun gear and the ring gear rotate idly, thus undesirably producing noise between teeth of these gears and those of the planetary gears.

SUMMARY OF THE INVENTION

Accordingly, the present invention has been developed with a view to substantially eliminating the above described disadvantages inherent in the prior art planetary gear type transmission, and has the essential object to providing an improved planetary gear type transmission whereby the change-over between high and low speed conditions can be smoothly done by virtue of a relatively small operational force.

Another important object of the present invention is to provide a planetary gear type transmission of the above described type which, in direct drive, can reduce noise caused by backlashes of teeth of gears in mesh with each other.

In accomplishing these and other objects, a transmission according to one preferred embodiment of the present invention is equipped with a planetary gear type transmission which is disposed between an input member and an output member within a casing and comprised of a sun gear, a ring gear, a plurality of planet gears in mesh with the sun gear and the ring gear, and a carrier carrying the planet gears and coupled with the output member. At least the carrier is unmovable in a direction axially of the input member. The input and output members are coupled with each other by bypassing the gears of the transmission unit in direct drive or via these gears in reduction ratio drive. The transmission of the present invention is further provided with a first change-over member in mesh with the input member for selectively connecting the input member with the carrier in direct drive or with the sun gear in reduction ratio drive and a second change-over member secured to the first change-over member for engaging the ring gear with the casing in reduction ratio drive or disengaging the former from the latter in direct drive.

The second change-over member can so move in the direction parallel to the input member as to engage with both the ring gear and the casing. Alternatively, the second change-over member may be integrally formed with the ring gear if the ring gear is restricted in rotational direction with respect to the casing and is reciprocable in the direction of its axis.

In the above described construction, the input member is selectively connected to either one of the sun gear and the carrier by means of the first change-over member. When the input member is connected to the carrier in direct drive, the ring gear is disengaged from the casing.

Accordingly, since the ring gear is made free in a high speed mode for the direct drive, the planetary gears are effectively prevented from rotating excessively.

Furthermore, unlike conventional cases, it is not necessary to shift the entire planetary gear unit in the transmission of the present invention. As a result, the change-over between direct and reduction ratio drive modes can be smoothly done by virtue of reduced operation force and the transmission is simplified in construction.

When the second change-over member is a member separate from the planetary gear unit, it can be formed into a compact size, which is greatly conducive to the reduced operation force during the change-over.

When this member is integrally formed with the reciprocable ring gear, the machining can be eliminated which is required for the aforementioned separate member at its portion in mesh with the casing and the ring gear, thus rendering the processability thereof to be improved.

In another aspect of the present invention, the transmission is provided with means for preventing backlashes of the gears of the transmission unit in mesh with each other in direct drive.

Such means is helpful for prevention of noise caused by the backlashes.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

A power transfer mechanism of a four-wheel drive vehicle is generally equipped with a main transmission unit, an auxiliary transmission unit and a differential gear unit.

Figure 1:
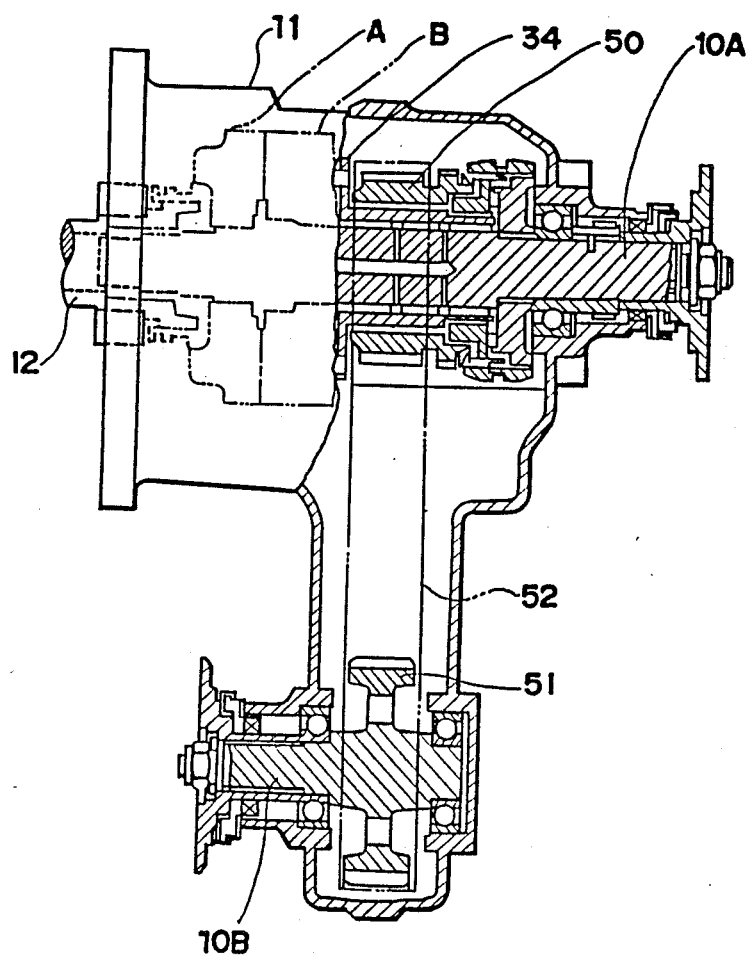
FIG. 1 is a side view, partly in section, of a planetary gear type transmission according to the present invention.

FIG. 1 depicts a planetary gear type transmission for use in a four-wheel drive vehicle. This transmission is comprised of an input shaft 12, a rear output shaft 10A for driving rear wheels, a front output shaft 10B for driving front wheels, a planetary gear type auxiliary transmission unit A and a planetary gear type differential gear unit B. The input shaft 12 and the rear output shaft 10A are accommodated in an upper portion of a casing 11. The front output shaft 10B is accommodated in a lower portion of the casing 11. The auxiliary transmission unit A and the differential gear unit B are interposed between the input shaft 12 and the output shafts 10A and 10B.

Figure 2:
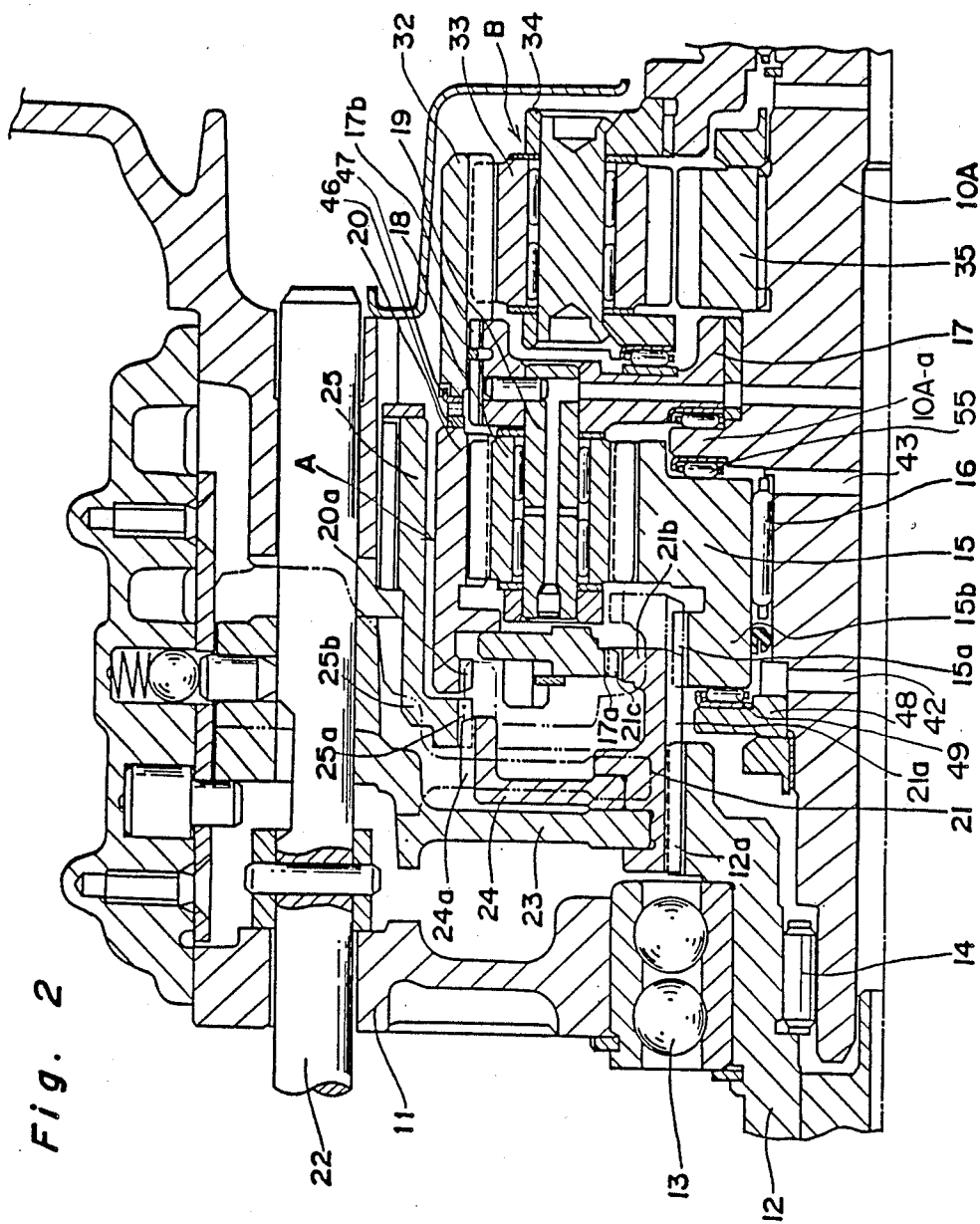
FIG. 2 is a sectional view, on an enlarged scale, of a main portion of FIG. 1 according to a first embodiment of the present invention.

FIG. 2 depicts a main portion of FIG. 1 according to a first embodiment of the present invention in which the transmission unit A is provided with a ring gear 20 which can not move in the direction of its axis with respect to the casing 11.

The output shaft 10A is rotatably journaled in a bearing (not shown) of the casing 11. The input shaft 12 is rotatably journaled in a bearing 13 of the casing 11 in alignment with the output shaft 10A. An end portion of the output shaft 10A is rotatably supported by means of a needle bearing 14 in a hollow formed in the input shaft 12.

A sun gear 15 of the auxiliary transmission unit A can rotate about the output shaft 10A via a needle bearing 16 in the vicinity of the input shaft 12.

A carrier 17 having a series of spline teeth 17b at its periphery is carried on the output shaft 10A in the vicinity of the sun gear 15. The carrier 17 is splined to a ring gear 32 of the differential gear unit B, which is further provided with plural sets of planet gears 33, a carrier 34 and a sun gear 35. Each set of planet gears 33 is comprised of two pinions 33a and 33b in mesh with the sun gear 35 and the ring gear 32, respectively.

As shown in FIG. 1, a gear 50 is so controlled as to engage with or disengage from the carrier 34. The former engages with the latter only at the time of four-wheel drive. This gear 50 and a gear 51 of the front output shaft 10B are connected to each other by means of a chain 52. The sun gear 35 is fixed to the rear output shaft 10A.

Accordingly, upon rotation of the carrier 17, the front output shaft 10B rotates via the ring gear 32, the planet gears 33 and the carrier 34. Simultaneously, the rear output shaft 10A rotates via the ring gear 32, the planet gears 33 and the sun gear 35.

A plurality of planet gears 18 are carried by means of respective shafts 19 on the carrier 17 and are engageable with the sun gear 15 and the ring gear 20. The ring gear 20 is carried by the planet gears 18.

A series of spline teeth 12a are formed at the periphery of the input shaft 12. In alignment with these spline teeth 12a, a series of spline teeth 15a are formed on a flange 15b of the sun gear 15. A change-over sleeve 21 is provided with a series of spline teeth 21a constantly in mesh with both the aforementioned spline teeth 12a and 15a. The change-over sleeve 21 is further provided at its flange 21b with another series of spline teeth 21c, which engage with the spline teeth 17a of the carrier 17 at its direct drive position shown in FIG. 2 and disengage therefrom at its reduction ratio drive position in which the sleeve 21 is shifted rightwards as shown by double dotted chain lines in FIG. 2.

A shift fork 23 is secured to the change-over sleeve 21 and is carried by a shift rod 22 which is reciprocably carried by the casing 11 in parallel with the input shaft 12 and the output shafts 10A and 10B. Upon reciprocation of the shift rod 22, the change-over sleeve 21 is shifted between its direct and reduction ratio drive positions via the shift fork 23.

A change-over member 24 having a series of spline teeth 24a at its periphery is secured to the change-over sleeve 21. The ring gear 20 is provided on its inner periphery with a series of spline teeth 20a which engage with the spline teeth 24a of the change-over member 24 when the sleeve 21 is shifted to its reduction ratio drive position.

A casing fixing member 25 of ferrous material spaced from the ring gear 20 is splined to the casing 11 of aluminum casting and is provided at its flange 25b with a series of spline teeth 25a in alignment with the spline teeth 20a of the ring gear 20. The spline teeth 24a of the change-over member 24 is constantly in mesh with those 25a of the casing fixing member 25.

Under the condition shown in FIG. 2, the change-over sleeve 21 is in its direct drive position in which the spline teeth 21c thereof engage with those 17a of the carrier 17. In this event, the change-over member 24 is disengaged from the ring gear 20.

Figure 3:
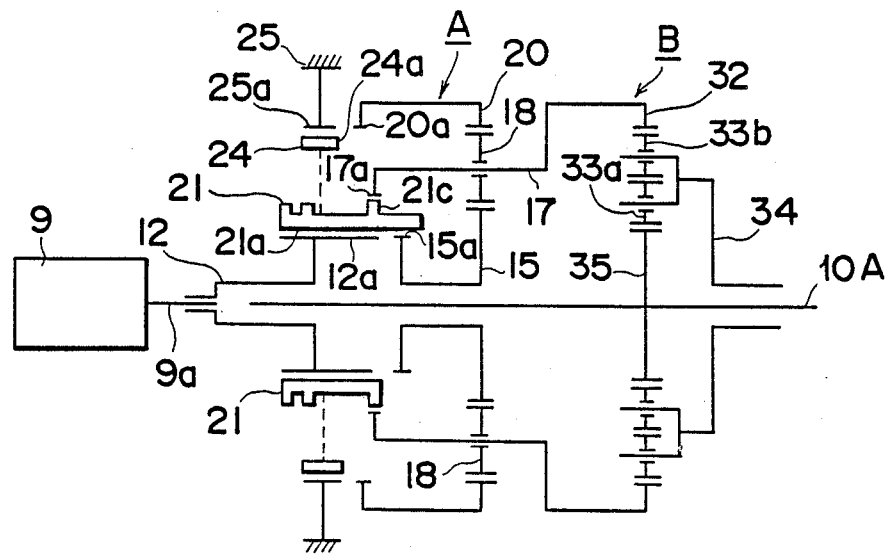
FIG. 3 is a diagram of a power transfer mechanism employing therein the transmission of FIG. 1 in a direct mode.

FIG. 3 schematically illustrates the power transfer mechanism in a direct drive mode. In this figure, reference numerals 9 and 9a designate the main transmission unit and an output shaft thereof, respectively.

In this mode, the rotational force of the input shaft 12 is transmitted to the output shafts 10A and 10B via the change-over sleeve 21, the carrier 17, the ring gear 32 and the like so that the output shafts 10A and 10B may be rotated at a high speed.

In such a direct drive mode, the ring gear 20 is kept free with respect to the casing 11, thus effectively preventing the planet gears 18 from rotating excessively.

When the change-over sleeve 21 is shifted rightwards, as viewed in FIG. 2, to its reduction ratio drive position by the shift fork 23, the change-over sleeve 21 is disengaged from the carrier 17 and the spline teeth 24a of the change-over member 24 engage with those 20a of the ring gear 20.

Figure 4:
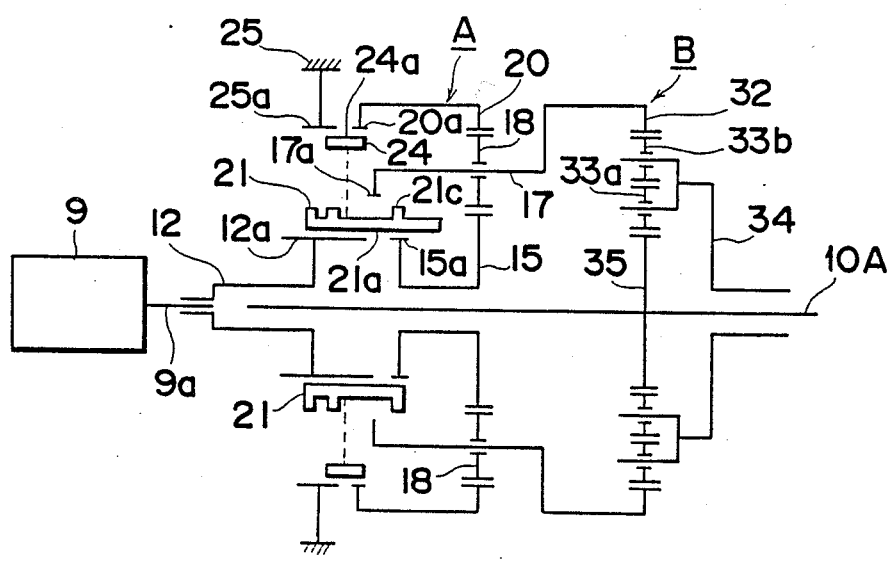
FIG. 4 is a diagram similar to FIG. 3, in a reduction ratio drive mode.

FIG. 4 schematically illustrates the power transfer mechanism in a reduction ratio drive mode.

In this mode, the ring gear 20 is fixed to the casing 11 via the spline teeth 20a thereof, those 24a of the change-over member 24 and those 25a of the casing fixing member 25. Accordingly, the rotational force of the input shaft 12 is transmitted at a reduced speed ratio to the output shafts 10A and 10B via the sun gear 15, the planet gears 18, the carrier 17, the ring gear 32 and the like, so that the output shafts 10A and 10B may be rotated at a low speed.

The change-over between the direct and reduction ratio drive modes is smoothly done merely by reciprocating the change-over sleeve 21 using the shift fork 23, thus rendering the operation force to be reduced.

Figure 5:
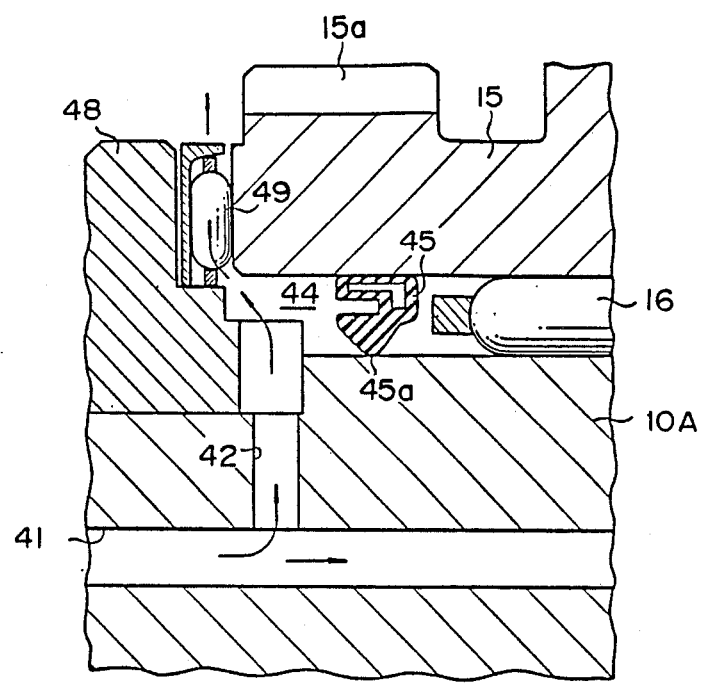
FIG. 5 is a sectional view, on an enlarged scale, of a friction damper and the vicinity thereof for prevention of backlashes of gears in an auxiliary transmission unit.

As described above, the sun gear 15 of the auxiliary transmission unit A is rotatably supported on the rear output shaft 10A via the needle bearing 16. Furthermore, as shown in FIGS. 2 and 5, the sun gear 15 is supported at its front surface, via a thrust needle bearing 49, by a flange 48 fixed to the rear output shaft 10A and at its rear surface, via a thrust needle bearing 55, by a flange 10A-a integrally formed with the rear output shaft 10A. A lubricating oil passage 41 is formed along the center of the rear output shaft 10A and lubricating oil passages 42 and 43 perpendicular to the oil passage 41 extend therefrom so that the needle bearings 16, 49 and 55 may be lubricated. A rubber made friction damper 45 is mounted in front of the needle bearing 16 in a space 44 formed between the sun gear 15 and the outer peripheral surface of the rear output shaft 10A. The friction damper 45 is pressed against the inner surface of the sun gear 15. The friction damper 45 has a lip 45a in contact with the outer surface of the rear output shaft 10A. Accordingly, as shown in FIGS. 2 and 5, when the auxiliary transmission unit A is changed to the high speed condition for establishing the direct drive mode, friction resistance produced between the friction damper 45 and the rear output shaft 10A brakes the sun gear 15 and prevents it from rotating idly, thus preventing noise between teeth of gears which may be produced due to backlashes. Furthermore, since the friction damper 45 is so provided as to clog an oil passage leading the oil passage 42 to the needle bearing 16, this damper 45 has an effect of increasing the amount of oil to be supplied to the thrust needle bearing 49 through the oil passage 42. The needle bearing 16 is sufficiently supplied with oil through the oil passage 43 formed behind it.

As shown in FIG. 2, a thrust washer 46 and a wave washer 47 are interposed between the rear surface of the ring gear 20 and the front surface of the ring gear 32 of the differential gear unit B splined to the carrier 17.

Figure 6:
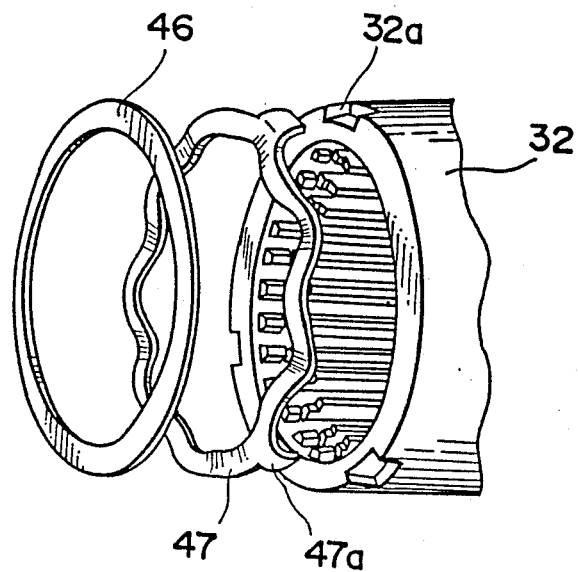
FIG. 6 is an exploded perspective view, on an enlarged scale, of two washers in mesh with a ring gear of a differential gear unit for prevention of backlashes.

FIG. 6 illustrates these washers 46 and 47 in detail. The wave washer 47 biases the thrust washer 46 against the rear surface of the ring gear 20 to apply friction resistance thereto. To this end, the wave washer 47 has a plurality of, for example, three lobes 47a which extend rearwards therefrom and engage with notches 32a formed at the front end of the ring gear 32 so that the wave washer 47 may be held by the ring gear 32. The thrust washer 46 is properly centered on the spline teeth 17b formed on the outer peripheral surface of the carrier 17.

In such a construction, when the auxiliary transmission unit A is in the high speed condition for establishing the direct drive mode, the friction resistance brakes the ring gear 20 and prevents it from rotating idly for prevention of noise which may be caused by the backlashes.

Figure 8:
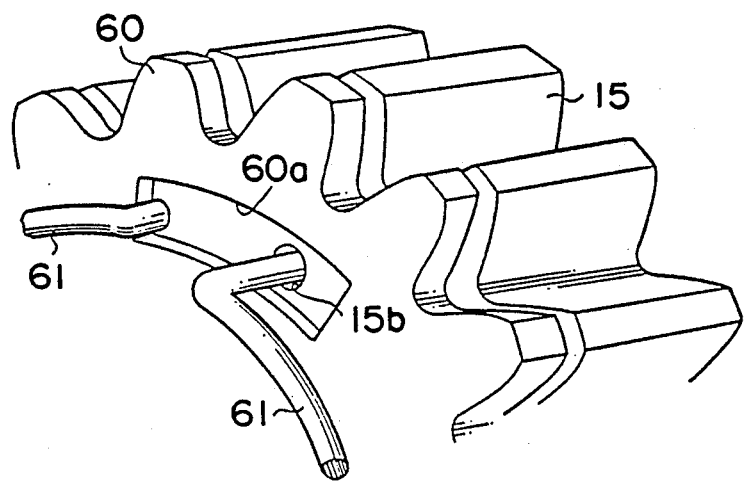
FIG. 8 is a fragmentary perspective view, on an enlarged scale, of a scissors gear and a torsional spring for prevention of backlashes in the transmission of FIG. 7.
Figure 7:
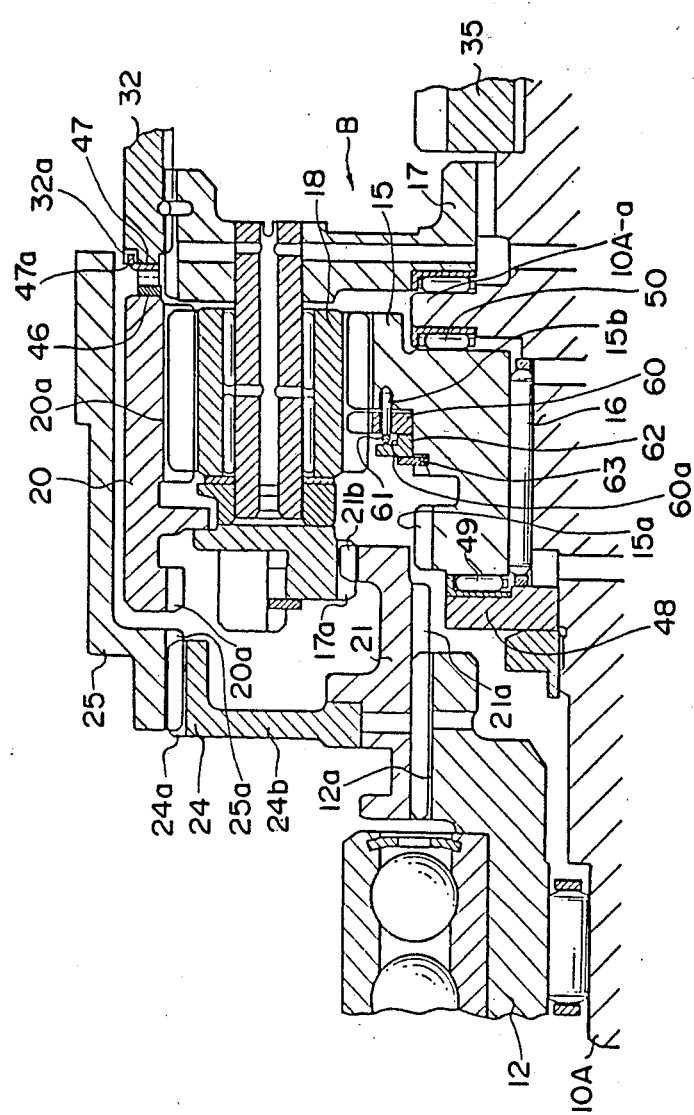
FIG. 7 is a sectional view, on an enlarged scale, of a main portion of the transmission according to a second embodiment of the present invention.

FIGS. 7 and 8 depict a main portion of the auxiliary transmission unit B according to a second embodiment of the present invention, which is provided with a scissors gear 60 for prevention of backlashes of the sun gear 15 in direct drive. The scissors gear 60 is freely rotatable together with the sun gear 15 and is securely held thereon by a retaining ring 63 through a spacer 62. The scissors gear 60 has the same diameter as the sun gear 15 and a series of teeth which are the same in number and in pitch as those of the sun gear 15. A circular arc notch 60a is formed in the scissors gear 60 and an opening 15b for receiving therein one end of a torsional spring 61 is formed in the sun gear 15 at a location corresponding to the notch 15b of the scissors gear 60. The interior of the opening 15b is reduced in diameter so that one end of the torsional spring 61 may be securely held therein. The other end of the torsional spring 61 is brought into contact with a side edge of the notch 60a. As a result, the torsional spring 61 produces a biasing force between the sun gear 15 and the scissors gear 60 in the direction circumferential of these gears 15 and 60 so that teeth of the planet gears 18 may be sandwiched between those of the sun gear 15 and those of the scissors gear 60.

Such a construction can also prevent noise of teeth of gears which may be caused by the backlashes of the sun gear 15 in the direct drive mode.

Figure 9:
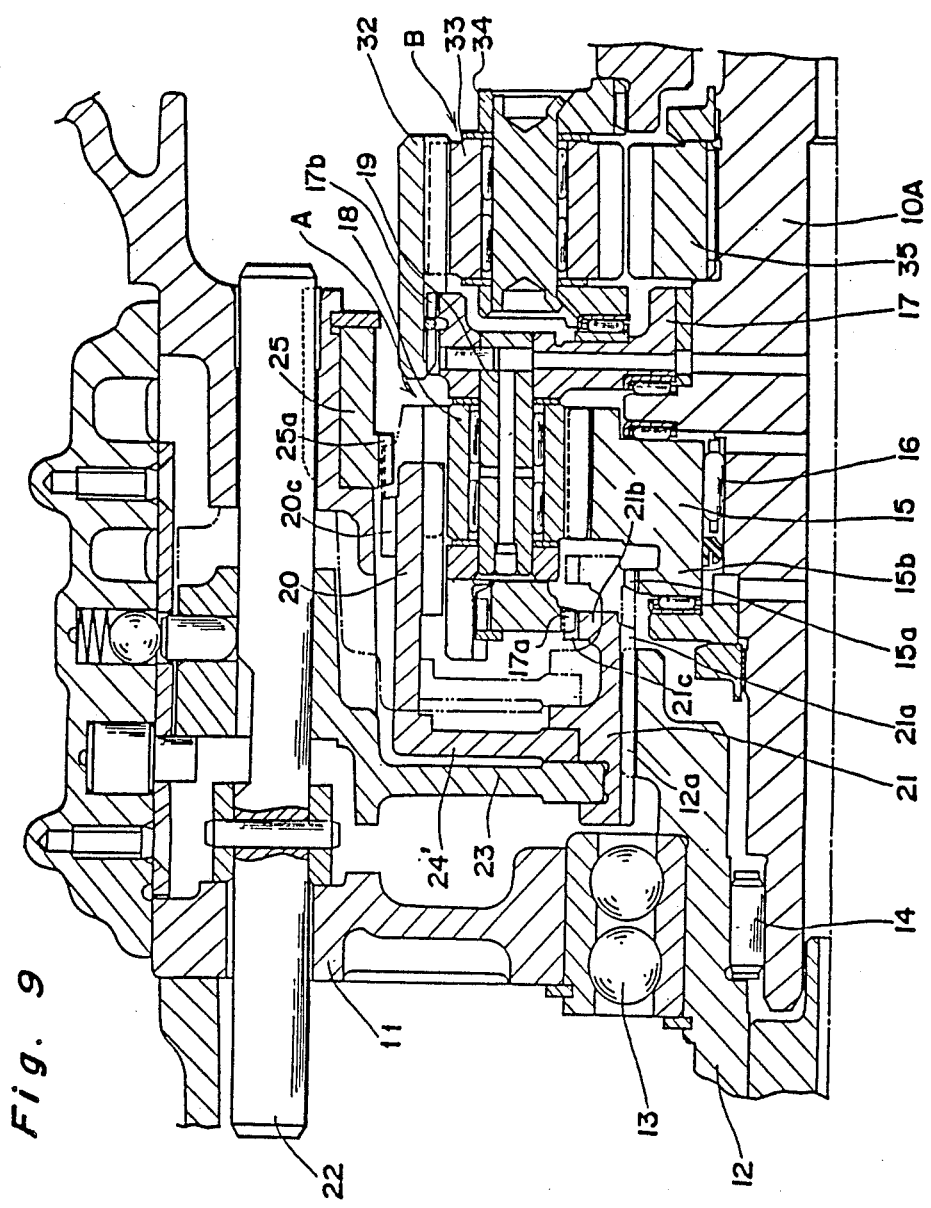
FIG. 9 is a view similar to FIG. 2, which particularly shows a modification thereof.
Figure 10:
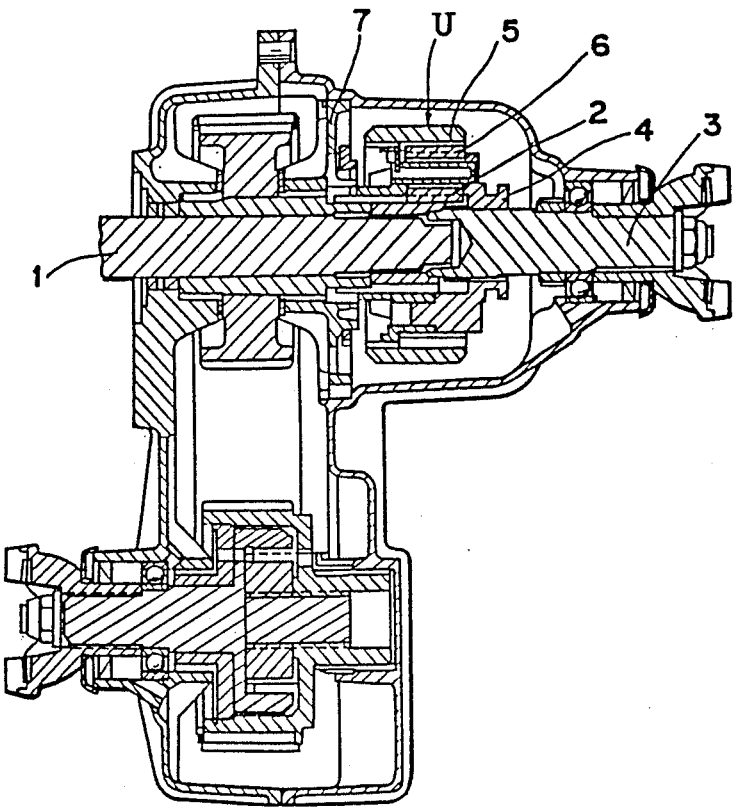
FIG. 10 is a sectional view of a conventional planetary gear type transmission in direct drive.
Figure 11:
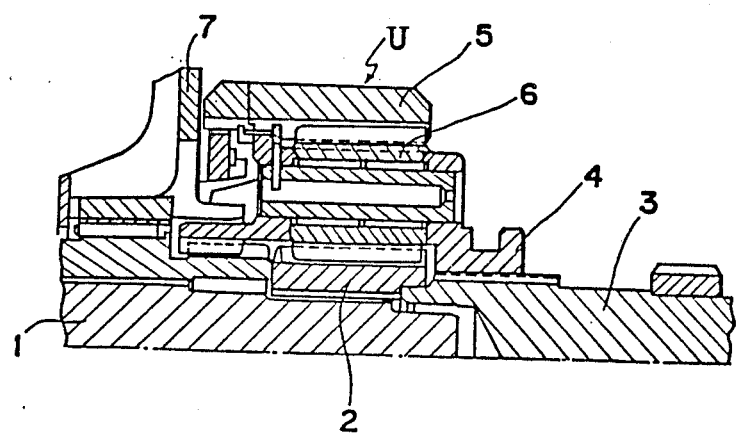
FIG. 11 is a sectional view, on an enlarged scale, of a main portion of FIG. 10 in a reduction ratio drive mode.

FIG. 9 depicts a modification of the planetary gear type transmission of FIG. 2, in which the ring gear 20 can move in the direction of its axis with respect to the casing 11.

In this modification, the ring gear 20 is extended inwards at its front end to form a change-over portion 24'. The change-over portion 24' is secured to the change-over sleeve 21 and is provided at its outer periphery with a series of spline teeth 20c which are engaged with those 25a of the casing fixing member 25.

In FIG. 9, the change-over sleeve 21 is in its direct drive position, in which the spline teeth 21c thereof are engaged with those 17a of the carrier 17 whereas the spline teeth 20c of the ring gear 20 are disengaged from those 25a of the casing fixing member 25.

Accordingly, the rotational force of the input shaft 12 is directly transmitted to the output shafts 10A and 10B via the change-over sleeve 21, the carrier 17, the ring gear 32 and the like so that the output shafts 10A and 10B may rotate in the high speed mode. In such direct drive, the ring gear 20 becomes free with respect to the casing 11, thus effectively preventing the planet gears 18 from excessively rotating.

When the change-over sleeve 21 is shifted rightwards, as viewed in FIG. 9, to its reduction ratio drive position using the shift fork 23, the spline teeth 21c of the change-over sleeve 21 are disengaged from those 17a of the carrier 17 whereas the spline teeth 20c of the ring gear 20 are engaged with those 25a of the casing fixing member 25.

Accordingly, since the ring gear 20 is fixed with respect to the casing 11, the rotational force of the input shaft 12 is transmitted at a reduced speed to the output shafts 10A and 10B via the sun gear 15, the planet gears 18, the carrier 17, the ring gear 32 and the like so that the output shafts 10A and 10B may rotate in the low speed mode.

Also, in this modification, the change-over between the direct and reduction ratio drive modes is smoothly done merely by reciprocating the change-over sleeve 21 using the shift fork 23, thus rendering the operation force to be reduced.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A transmission having a planetary gear type transmission unit comprising:
    a casing;
    an input member;
    an output member;
    a sun gear, a ring gear, and a carrier carrying a plurality of planet gears in said casing for coupling said input member to said output member in a direct drive mode or a reduction ratio drive mode, said planet gears being in mesh with said sun gear said ring gear, said carrier being coupled with said output member, and at least said carrier being unmovable in an axial direction of said input member;
    a first change-over member connected with said input member for selectively connecting said input member with said carrier in said direct drive mode or with said sun gear in said reduction ratio drive mode; and
    a second change-over member secured to said first change-over member for engaging said ring gear with said casing in said reduction ratio drive mode or disengaging said ring gear from said casing in said direct drive mode.

2. The transmission as set forth in claim 1, wherein:
    said ring gear and said casing are unmovable in said axial direction of said input member, and said second change-over member is movable in said direction to engage with both said ring gear and said casing.

3. The transmission as set forth in claim 2, and further comprising:
    means for preventing backlashes of said gears in mesh with each other when said input member is coupled to said output member in said direct drive mode.

4. The transmission as set forth in claim 3, wherein:
    said means for preventing backlash comprises a first backlash preventing device and a second backlash preventing device, said first backlash preventing device comprising a friction damper interposed between said output member and said sun gear for preventing idle rotation of said sun gear, and said second backlash preventing device comprising a wave washer biased against said ring gear for preventing idle rotation of said ring gear.

5. The transmission as set forth in claim 3, wherein:
    said means for preventing backlash comprises a first backlash preventing device and a second backlash preventing device, said first backlash preventing device comprising a scissors gear and a biasing means for generating a biasing force to sandwich teeth of said planet gears between the teeth of said sun gear and the teeth of said scissors gear, said second backlash preventing device comprising a wave washer biased against said ring gear for preventing idle rotation of said ring gear.

6. The transmission according to claim 1, wherein:
    said planet gears are unmovable in their respective axial directions, said second change-over member is integral with said ring gear, and said ring gear is slidable in its axial direction.

7. A transmission having a planetary gear type transmission unit comprising:
    a casing;
    an input member;
    an output member;
    a sun gear, a ring gear, and a carrier carrying a plurality of planet gears in said casing for coupling said input member to said output member in a direct drive mode or a reduction ratio drive mode, said planet gears being in mesh with said sun gear and said ring gear, and said carrier being coupled with said output member;
    a first change-over member connected with said input member for selectively connecting said input member with said carrier in said direct drive mode or with said sun gear in said reduction ratio drive mode; and
    a second change-over member secured to said first change-over member for engaging said ring gear with said casing in said reduction ratio drive mode or disengaging said ring gear from said casing in said direct drive mode; and
    means for preventing backlashes of said gears in mesh with each other when said input member is coupled to said output member in said direct drive mode.

8. The transmission according to claim 7, wherein:
    said means for preventing backlashes comprises a first backlash preventing device and a second backlash preventing device, said first backlash preventing device comprising a friction damper interposed between said output member and said sun gear for preventing idle rotation of said sun gear, and said second backlash preventing device comprising a wave washer biased against said ring gear for preventing idle rotation of said ring gear.

9. A transmission having a planetary gear type transmission unit comprising:
    a casing;
    an input member;
    an output member;
    a sun gear, a ring gear, and a carrier carrying a plurality of planet gears in said casing for coupling said input member to said output member in a direct drive mode or a reduction ratio drive mode, said planet gears being in mesh with said sun gear and said ring gear, said carrier being coupled with said output member, and at least said carrier being unmovable in an axial direction of said input member; and
    means for preventing backlashes of said gears in mesh with each other when said input member is coupled to said output member in said direct drive mode, wherein
    said means for preventing backlashes comprises a first backlash preventing device and a second backlash preventing device, said first backlash preventing device comprising a friction damper interposed between said output member and said sun gear for preventing idle rotation of said sun gear, and said second backlash preventing device comprising a wave washer biased against said ring gear for preventing idle rotation of said ring gear.

* * * * *